UNITED STATES PATENT OFFICE.

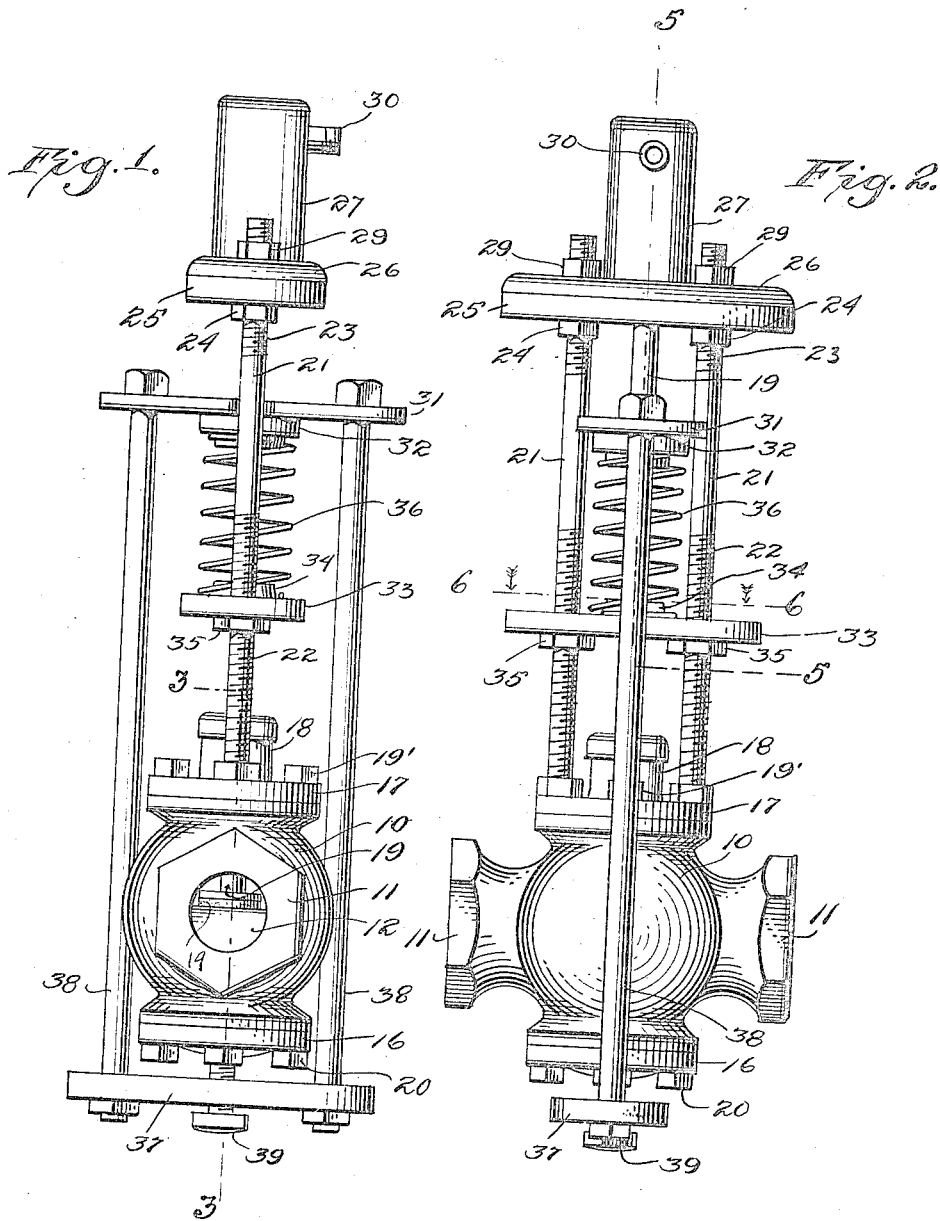

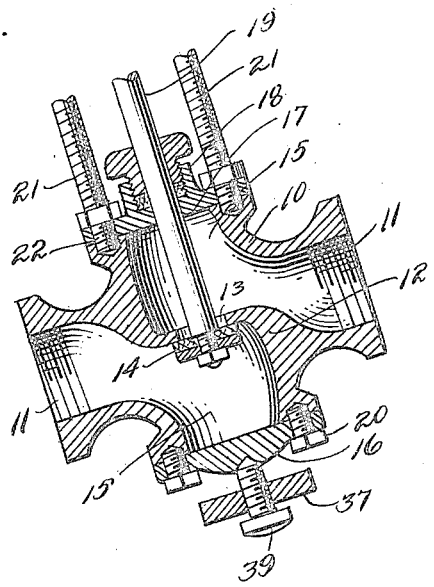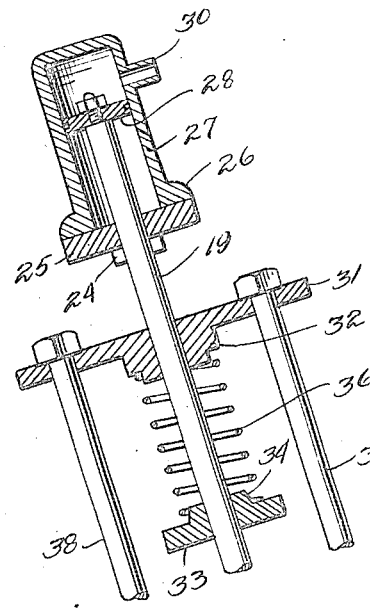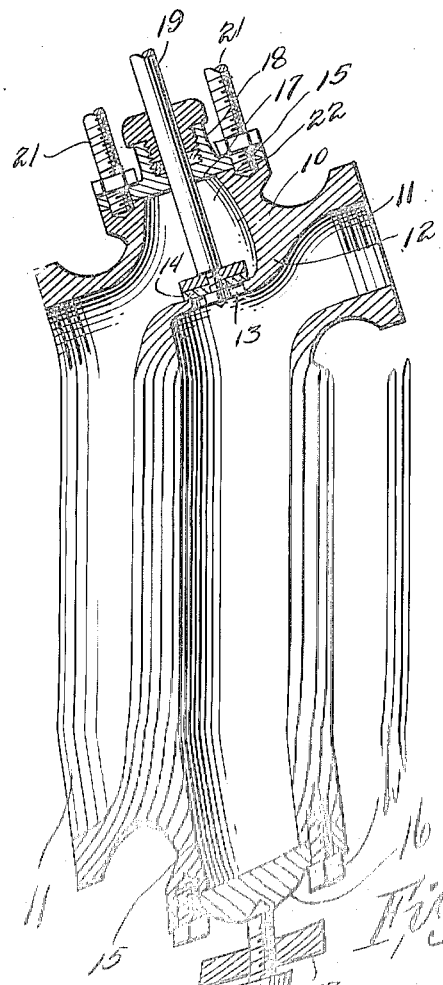

JAMES H. ZOBELL, OF CASTLEGATE, UTAH.

CONVERTIBLE VALVE.

1,254,460.

Specification of Letters Patent.

Patented Jan. 22, 1918.

Application filed October 9, 1916. Serial No. 124,597.

*To all whom it may concern:*

Be it known that I, JAMES H. ZOBELL, a citizen of the United States, residing at Castlegate, in the county of Carbon, State of Utah, have invented certain new and useful Improvements in Convertible Valves; and I do hereby declare the following to be a full, clear, and exact description of the invention, such as will enable others skilled in the art to which it appertains to make and use the same.

This invention relates to valves and has special reference to a convertible pressure regulating and safety valve adapted especially in use in connection with steam pumps and the like.

One important object of the invention is to provide a valve of this class with a reversible body so that the valve seat may be engaged by the valve disk either to open in one direction or the other.

A second important object of the invention is to provide a valve of this class with an improved arrangement of spring means for urging the valve disk to or from its seat, the spring means being adjustable so that the force required to open or close the valve may be regulated, the valve being further provided with other means than the adjusting means for the spring for temporarily increasing or decreasing the tension of said spring, the last-mentioned means being arranged to normally keep the spring means under a uniform tension after it is set.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is an elevation of the device taken from one end of the valve body.

Fig. 2 is a similar view taken from one side of the valve body.

Fig. 3 is a section on the line 3—3 of Fig. 1 showing the valve body in one position.

Fig. 4 is a section similar to Fig. 3 but showing the valve body in its inverted position.

Fig. 5 is a section on the line 5—5 of Fig. 1.

Fig. 6 is a section on the line 6—6 of Fig. 2.

In the embodiment of the invention herein illustrated there is disclosed a valve body 10 provided at each end with suitable means for connecting a pipe thereto as indicated at 11. Extending across this valve body is the usual diaphragm 12 provided with an opening 13 therein, the diaphragm being formed at one side of the opening to constitute a valve seat whereon may seat a valve disk 14. At each side of the valve body 10 there are disposed openings 15 concentric with the opening 13 and one of these openings is closed by a blind flange 16 while the other opening is closed by a bonnet 17 having the usual stuffing box 18. Through the stuffing box 18 passes a valve stem 19 carrying the valve disk 14. It is to be noted that the stuffing box and its bonnet are secured to the body by means of bolts 19' while the blind flange is secured by bolts 20. These bolts engage similarly spaced openings in the bonnet and blind flange, the bolt holes in the body being the same on each side so far as regards their spaced relation. By this means the flange 16 may be secured to the valve casing on either side of the diaphragm 12 and the same is true of the bonnet 17. When positioned at one side the valve disk 14 will lie below the diaphragm 12 with relation to the bonnet while when the bonnet is placed on the other side of the body the disk will lie closer to the bonnet than the diaphragm, these positions being shown in Figs. 3 and 4, respectively.

Extending from the body in parallel relation to the stem 19 and in the same direction as said stem is a pair of spaced rods 21 having their lower ends threaded as at 22 and their upper ends threaded as at 23. On the threaded portions 23 are nuts 24 whereon rests a bed plate 25. On this bed plate is positioned a second plate 26 which carries a cylinder 27 opened downwardly and into which the valve stem 19 passes, the stem being provided on the end within the cylinder with a piston 28. Nuts 29 hold the cylinder in position on the bed plate 25. Furthermore there is provided in the cylinder a pipe connection 30 so that the pipe may be connected thereto and led to the reservoir or the like, the pressure in which it is desired to regulate. It is to be understood, at this time, that the connections 11 are for the steam or power lines. Between the bed plate 25 and the bonnet 17 there is fixed to the stem 19 a transverse plate 31 carrying a spring seat 32. Slidable on the stem 19 and the rods 21 is a plate 33 carrying a spring seat 34. This plate 33 is adjusted to or from the plate 31 by means of nuts 35 engaged on the threaded portions 22. Between the spring seats 32 and 34 is a coil spring 36 which normally holds the plate 33 against the nuts 35. Now it will be obvious that by means of these nuts 35 the adjustment of the tension on the spring 36 may be effected. In order to manually change the position of the valve stem, and consequently the valve, without interfering with the adjustment of the spring 36 the plate 31 is connected to a plate 37 which passes transversely across the valve body on the side carrying the plate 16 by means of bolts 38. Furthermore through the plate 37 passes a hand screw 39 the point of which bears against the plate 16 so that by rotating this screw in one direction the plate 31 is drawn down toward the plate 33 against the tension of the spring but when the screw 39 is rotated in the opposite direction the plate 37 will hang free so that the spring may act independently of said plate 37. By this means after the spring 36 has been kept for the required service the valve may be moved without interfering with the setting of said spring.

When the device is to be used as a safety valve the parts are arranged in the position shown in Fig. 3 and the connection 30 connected to the reservoir or other receptacle the pressure of which it is desired to maintain below a certain point. In like manner the left hand end of the valve body is connected to this vessel or reservoir and the spring 36 so adjusted that the downward pressure on the piston 28 will be exceeded by the upward pressure of the spring 36 to the required amount of pressure to be maintained. When, however, this pressure is exceeded then the piston 28 will be forced down against the action of the spring 36 and the valve disk 14 carried down with the valve stem so that the valve will be opened. When the pressure again drops the parts resume their normal position such as is shown in Fig. 3. When the valve is arranged for a pressure regulating valve the parts are positioned as in Fig. 4, the right hand end being the inlet end of the valve. It will be obvious that in this position the valve will normally be opened or partly opened but increase of pressure in the cylinder which is connected to the reservoir, will partly close the valve and thus cut off steam from the pump. Vice versa, decrease of pressure will open the valve more and let the pump run faster.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. A device of the class described including a valve body having a diaphragm intermediate its ends and provided with an opening surrounded by a valve seat and the body having lateral openings, a bonnet, a blind flange, means to interchangeably secure said bonnet and flange to the body to cover said openings, a stem extending through the bonnet, a valve carried by the stem and adapted for engagement with said seat on opposite sides thereof, a yoke attached to the stem and supported by the valve body, a plurality of screw threaded standards carried by the valve body in a plane at right angles to the yoke, adjustable means carried by said standards, and a spring mounted between the adjustable means carried by the standards and one end of the yoke for moving the valve stem in one direction.

2. A device of the kind described including a valve body provided with a passage affording communication between the ends of said body, a valve controlling the said passage, a pair of screw threaded standards projecting from the valve body, a plate slidably carried on said screw threaded standards, a yoke attached to the stem and supported by the valve body and said standards, a spring interposed between the slidable plate and one end of the yoke to move the valve in one direction, and a means for moving said slidable plate for adjusting the tension of said spring.

3. A device of the kind described including a valve body provided with a passage affording communication between the ends of said body, a valve controlling said passage, spring means connected with said valve and urging the same in one direction, a fluid pressure device urging said valve in the opposite direction and having connection with said valve, a tensioning device for regulating the tension of said spring means, and means to vary the tension of the spring means independently of the tensioning device.

4. A device of the kind described including a valve body provided with a passage affording communication between the ends of said body, a valve controlling said passage, a bonnet on said body, a valve stem passing through said bonnet and carrying the valve, a plate extending transversely across the body on the side opposite the bonnet, a screw passing through said plate and engaging the body to vary the distance between said plate and body, rods rigidly connected to the body and extending therefrom parallel to the valve stem, a fluid pressure chamber provided with pipe connecting means and mounted on said rods in spaced relation to the body, said valve stem extending into the fluid pressure chamber, a piston on said valve in said chamber, a plate fixed to the valve stem transversely of the body and adjacent the chamber, bolts connecting said plates to hold the same in fixed spaced relation, a third plate slidable on said stem and rods between the second plate and body, nuts screwed on said rods to hold the third plate adjustably spaced from the body, and a coil spring surrounding said valve stem between the second and third plates and bearing thereon.

In testimony whereof, I affix my signature, in the presence of two witnesses.

JAMES H. ZOBELL.

Witnesses:
J. A. THORPE,
W. N. WALTERS.

Copies of this patent may be obtained for five cents each, by addressing the "Commissioner of Patents, Washington, D. C."